Oct. 11, 1949.  O. M. KIRLIN  2,484,038
SPEEDOMETER ATTACHMENT
Filed April 11, 1947

INVENTOR.
OTIS M. KIRLIN
BY
J S Murray
ATTORNEY

Patented Oct. 11, 1949

2,484,038

UNITED STATES PATENT OFFICE 2,484,038

SPEEDOMETER ATTACHMENT

Otis M. Kirlin, Detroit, Mich.

Application April 11, 1947, Serial No. 740,868

3 Claims. (Cl. 200—56)

This invention relates to attachments for vehicle speedometers, and particularly attachments exercising an automatic control when a selective maximum speed is indicated by a speedometer.

An object of the invention is to equip a speedometer with a freely adjustable pointer auxiliary to and coaxial with the usual speed responsive pointer of the instrument, and to provide for closing of an electric circuit and for resultant energization of an audible signal device when the speed-responsive pointer reaches a set position of the auxiliary pointer.

Another object is to adapt an attachment of the above described character to be easily attached to a speedometer or built into the latter at a quite moderate expense.

These and various other objects are attained by the construction hereinafter described and illustrated in the accompanying drawing, wherein.

Figure 1:
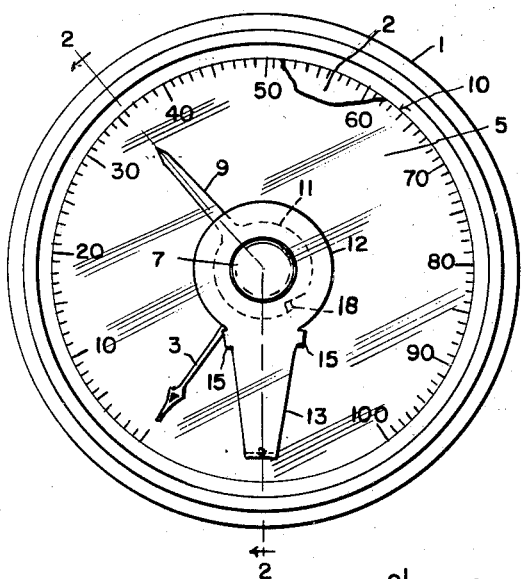
Fig. 1 is a front view of an ordinary speedometer to which my attachment is applied.
Figure 2:
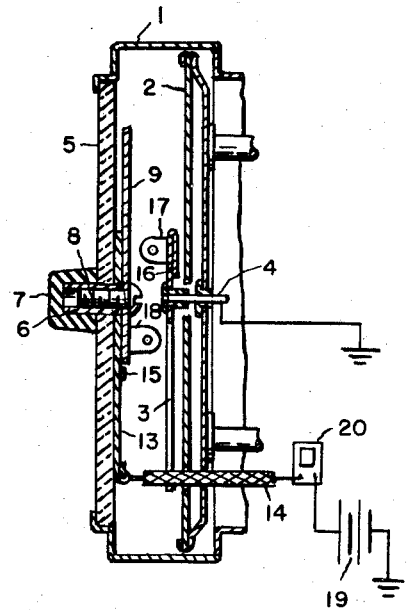
Fig. 2 is an axial sectional elevation of the same, taken on the line 2—2 of Fig. 1, omitting the ordinary drive mechanism for the speed-responsive pointer.

In these views, the reference character 1 designates the casing of an ordinary speedometer, 2 the dial thereof, 3 the usual speed-responsive pointer traveling said dial, 4 the spindle which mounts and drives said pointer and 5 the transparent cover plate which shields the pointer and dial. In applying my attachment, the plate 5 is formed with a central opening rotatably receiving a metal stud 6 rigidly projecting from a knob 7 of insulating material exteriorly adjacent said plate. A headed screw 8, inserted in the inner end of said stud, clamps a pointer 9 fixedly on said stud, the length of said pointer being substantially equal to that of the pointer 3 so that both may coact with the usual arcuate speed scale 10 of the dial. The pivotal end of the pointer 9 is enlarged to a disk form, as indicated at 11, to afford ample electrical contact with a disk portion 12 of an arm 13 mounted on the stud 6 between the plate 5 and pointer 9. The arrangement is such that the two disk portions are relatively rotative while constantly held in frictional contact. To the outer end of the arm 13 is soldered or otherwise connected a conductor 14 extended through the dial 2 and thus holding said arm in a fixed radial relation to the dial. Between the zero point of the scale 10 and its maximum figure there is usually a gap of some seventy-five degrees, and the arm 13 preferably occupies a medial relation to such gap. A pair of lugs 15 inwardly projecting from said arm, close to its disk portion, serve as stops for the pointer 9, limiting its path of travel to the arcuate extent of the scale 10. Aligned with the pointer 3 and rigidly projecting from its pivotal end is a relatively short arm 16 terminally formed with a contact lug 17 projecting toward the plate 5, and an oppositely projecting contact lug 18 is carried by the disk portion of the pointer 9, the lugs 17 and 18 mutually engaging when the pointers 3 and 9 occupy like indicating positions with respect to the scale 10. The pointer 3 is grounded, as appears from the electrical diagram in Fig. 2, and the conductor 14 is extended to a terminal of a car or other battery 19, the other terminal of which has the usual ground connection. Inserted in the conductor 14 is a buzzer 20 or other audible signal device having any convenient location within the vehicle (not shown) wherein the described speedometer is installed.

In operation of the described attachment, the pointer 9 is set by means of the knob 7 to indicate a desired maximum safe speed, the illustrated setting being 35 M. P. H. Whenever this speed is reached by the vehicle, the contacts 17 and 18 interengage thus closing the circuit of the buzzer or the like 20 and audibly warning the driver to reduce speed. A safety signal of this nature is highly desirable, since it allows a driver to keep his eyes on the road and still be informed if his speed exceeds a predetermined safe or legal limit. Such an attachment is particularly useful when driving in heavy traffic or on a mountainous or other road requiring constant observation. It is also a safeguard against neglect on the part of a driver, due to weariness or illness, to properly regulate his speed. As is evident, the construction is readily attachable to speedometers in present use, and may be installed in the course of manufacturing a speedometer with only small additional cost.

Figure 3:
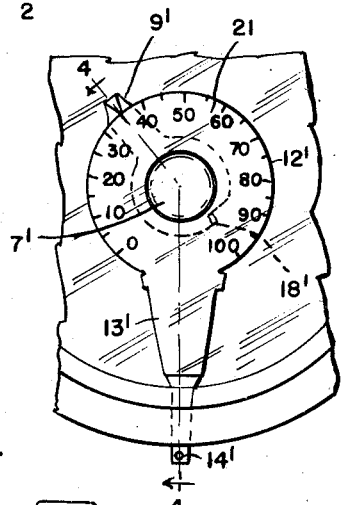
Fig. 3 is a front view of a modified construction.
Figure 4:
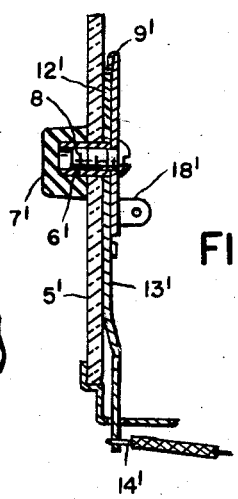
Fig. 4 is a sectional view of the modified construction, taken on the line 4—4 of Fig. 3.
Figure 5:
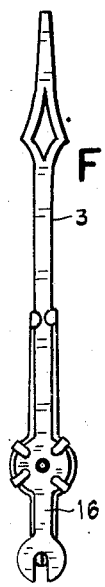
Figs. 5 and 6 are views showing opposite sides of the speed-responsive pointer of a speedometer showing an attached sheet metal support for a contact lug.
Figure 6:
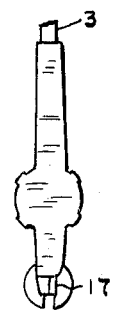
Figure 7:
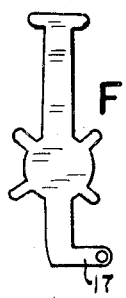
Fig. 7 is a view of the stamping from which said support is formed.

The modification shown in Figs. 3 and 4 differs from the construction first described in that the disk portion 12' of the arm 13' is marked on its front face with a scale 21 reading in miles per hour and having the same range and substantially the same calibrations as the scale 10. The pointer 9' is considerably shorter than the pointer 9 since it is to be set with reference to the scale 21. The conductor 14' leading from the arm 13' passes radially through the casing 1 instead of through the dial as in the first-described construction, and rotation of the arm 13' is prevented by restraint applied to said conductor by the casing. As thus modified, the attachment presents the advantage that no possible confusion can possibly arise between the speed-responsive pointer and the selectively positioned pointer. However, in either form of the invention it is a simple matter to amply distinguish the two pointers by shape or color or both.

What I claim is:

1. An attachment for a speedometer having a pivotal speed-responsive pointer and an arcuate scale traveled by such pointer, and a transparent plate shielding said pointer and scale, said attachment comprising an element journaled in said plate co-pivotally with said pointer, a second pointer fixed on said element interiorly of said plate, means carried by said element exteriorly of said plate for setting the second pointer, contacts respectively rotative with the respective pointers and interengageable when the two pointers are in a corresponding relation to said scale, a circuit including and normally broken at said contacts, such circuit including a member occupying a fixed position between said second pointer and the transparent plate, and means on said member for limiting travel of the second pointer to the arc occupied by said scale.

2. An attachment for a speedometer as set forth in claim 1, the travel-limiting means on said member consisting of a pair of lugs projecting from said member at opposite margins thereof.

3. An attachment for a speedometer having a pivotal speed-responsive pointer, a scale traveled by such pointer, and a transparent plate shielding the pointer and scale, said attachment comprising an element journaled in said plate at the extended pivotal axis of said pointer, a manually adjustable pointer secured on said journaled element interiorly of said plate, a knob for adjusting the adjustable pointer secured to said element exteriorly of said plate, a pair of electrical contacts respectively rotative with the respective pointers and interengageable through the substantial registering of said pointers with respect to said scale, and a circuit including and normally broken at said contacts and further including a member pierced by said journaled element and gripped between the second pointer and the transparent plate to establish good electrical contact with the adjustable pointer, and carrying an arcuate scale traveled by the adjustable pointer, and having stops limiting travel of such pointer, and means restraining said circuit member from rotation about said journaled element.

OTIS M. KIRLIN.

REFERENCES CITED

The following references are of record in the file of this patent:

UNITED STATES PATENTS

| Number | Name | Date |
|---|---|---|
| 942,497 | Harris | Dec. 7, 1909 |
| 1,055,446 | Copeman | Mar. 11, 1913 |
| 1,118,742 | Cole | Nov. 24, 1914 |
| 1,401,396 | Davis | Dec. 27, 1921 |
| 1,499,765 | Falck | July 1, 1924 |
| 1,789,685 | Pudelko | Jan. 20, 1931 |
| 2,100,214 | Graham | Nov. 23, 1937 |
| 2,111,403 | Oyen | Mar. 15, 1938 |
| 2,112,880 | Brewer | Apr. 5, 1938 |
| 2,214,567 | Rosenthal | Sept. 10, 1940 |
| 2,261,770 | Kusinitz | Nov. 4, 1941 |
| 2,322,703 | Polin | June 22, 1943 |